United States Patent Office 2,700,023
Patented Jan. 18, 1955

2,700,023

PROCESS OF MAKING MOLDED CERAMIC FERROMAGNETIC PRODUCTS

Ernst Albers-Schönberg, Metuchen, N. J., assignor to Steatite Research Corporation, Keasbey, N. J., a corporation of Delaware No Drawing. Application March 10, 1951,
Serial No. 215,002

3 Claims. (Cl. 252—62.5)

This invention relates to a novel process of preparing molded ferrite products. These products have the approximate general formula of $MO \cdot Fe_2O_3$ in which MO represents one or a mixture of several bivalent oxides.

Ferromagnetic oxide compounds—the so-called ferrites—consist in the raw state, of a mixture of iron oxide ($Fe_2O_3$ as the main ingredient) and other oxides such as nickel oxide, manganese oxide etc. But a mixture of raw oxides only, is not adapted to be molded either by pressing or extruding. The body is too soft, the shrinkage is high and the fired pieces suffer from cracks and warping.

To adapt the body better to the ceramic molding process, it has been proposed by other authors to prefire the intimate mixture of raw materials or in other words, to calcine it, and it has become usual to subject the body to a temperature of about 1800° F. where the composition loses its reddish brown color and turns to a dark tobacco brown shade. This fired material is then finely ground, binders and water are added, and then the parts—for example, magnetic cores or slugs—are pressed and the pressed objects are subjected to the final firing.

This method, however, has its disadvantages. The calcined powder is sandy and lacks entirely any plasticity. It needs considerable amounts of binders and sticking agents to transform it into a moldable substance. With reference to the magnetic properties of the final product it can be stated, that the calcining, anticipating partially the interaction of the oxides, has an improving effect, but the gain is not very large. Most of the reaction and the new formation of crystals takes place only at the maturing temperature in the second firing.

An object of this invention is to provide an improved process of forming such molded products.

Another object of the invention is to provide a pretreated calcined master composition which is fired but which can be mixed with raw unfired oxides to provide several final products of varying compositions without an adidtional prefiring or calcining step.

These objects and others ancillary thereto are obtained by calcining a mix adapted to form a ferrite product at a temperature approximating the maturing temperature of the ferrite composition. (This temperature is considerably higher than the previously mentioned calcining temperature of 1800° F.) The mixed material is fired as a loose powder so that the formation of hard, rocky lumps is avoided. A full reaction takes place, the color turns to gray-black, but the material on the whole remains coarse and brittle, so that any lumps resulting can be easily crushed.

This calcine is then employed as a part of the final composition. Thus 25–75% of the calcine may be mixed with 75–25% of raw oxides to produce the final composition. With less than 25% of calcine the shrinkage increases rapidly whereas with more than 75% the plasticity of the body decreases.

A mixture of this kind is very convenient, because it contains soft, plastic and moldable substances as well as heavy, hard non-plastic ones. The addition of organic binders can be small, because of the natural plasticity of the uncalcined material; the water necessary for molding is well absorbed and retained within a mixture of this kind.

There is another peculiarity of this process. It is not necessary that the calcined material have exactly the composition of the final body. When adding the raw oxides to the calcine, the composition can be changed or adjusted. A body containing, for instance, nickel oxide, zinc oxide, manganese oxide and trivalent iron oxide, may be built up from a calcine containing nickel oxide, zinc oxide, and iron oxide only, while the raw part of the body contains all of the four oxides, including the total weight of the manganese oxide.

Another advantage of the described method is that, starting from one and the same calcine, a number of different bodies can be composed. This facilitates the production, whenever a variety of bodies differing in properties have to be manufactured simultaneously.

To illustrate how the process of the invention is carried out in actual practice, the following example is given:

Example 67 parts by weight of iron oxide ($Fe_2O_3$) are mixed with 11 parts by weight of nickel oxide and 22 parts by weight of zinc oxide. These materials are thoroughly ground and mixed and then introduced into a refractory container and fed to a furnace wherein the mix is subjected to a temperature of 2230° F., the maturing temperature of this composition (as a ferrite body) being approximately 2270° F. As indicated, the temperature actually employed may be slightly below or slightly above the maturing temperature. The time of treatment varies with the temperature and the maturing point of the composition and can be from 2 hours at 2280° F. to 6 hours at 2230° F., for example.

The resultant product is a lumpy, brittle material which is easily crushed or ground to small size, for example 100 mesh. 40 parts of the ground calcined powder are mixed with 60 parts of untreated metal oxides made up of 40.3% by weight of $Fe_2O_3$, 8.7% by weight of NiO and 11% by weight of ZnO. The mix is combined with water containing an organic binder such as gum and flour so as to form a plastic moldable composition. This composition is molded under high pressure for example 2000 p. s. i. and then fired at the maturing temperature (about 2300° F.) to produce the final molded product.

Aside from the bivalent oxides disclosed in the above example any of the desired bivalent metal oxides employed in ferromagnetic ferrites can be added and the proportions of untreated oxides to be added may be such as to furnish a variety of ferrites with different compositions and consequently different properties.

It will be seen that this invention provides a process of making numerous ferrites in which the expense, time and equipment necessary for the preliminary conditioning of the raw metal oxides or oxide-forming materials is considerably reduced.

I claim:

1. In the preparation of a molded and cured ceramic ferromagnetic body having the approximate chemical formula of $x(MO)yFe_2O_3$ wherein MO represents at least one bivalent metal oxide and where $x$ and $y$ are approximately equal to one formed from a mixture of unreacted trivalent iron oxide and at least one bivalent oxide and in the firing of which a considerable amount of shrinkage takes place due to the reaction between the ingredients, the improved process which comprises the steps of firing and calcining a master mix of reacting proportions of trivalent iron oxide and at least one bivalent metal oxide at approximately the maturing temperature of the composition to produce a coarse brittle reaction product, grinding the resultant calcine, mixing the said ground calcine with at least two raw uncalcined powdered metal oxides comprising trivalent iron oxide and a bivalent metal oxide so as to provide a composition having the proportions of metal oxides desired in the final product, the proportion of calcined material to raw material being between 25:75 and 75:25, adding water, molding the mix to the desired shape and finally firing the molded articles.

2. In the preparation of a molded and cured ceramic ferromagnetic body having the approximate chemical formula of $x(MO)yFe_2O_3$ wherein MO represents at least one bivalent metal oxide and where $x$ and $y$ are approximately equal to one formed from a mixture of unreacted trivalent iron oxide and at least one bivalent oxide and in the firing of which a considerable amount of shrinkage takes place due to the reaction between the ingredients, the improved process which comprises the steps of firing and calcining a master mix of reacting proportions of trivalent iron oxide and at least one bivalent metal oxide at approximately the maturing temperature of the composition to produce a coarse brittle reaction product, grinding the resultant calcine, mixing the said ground calcine with raw uncalcined powdered metal oxides so as to provide a composition having the proportions of metal oxides desired in the final product, the proportion of calcined material to raw material being between 60:40 and 40:60, adding water, molding the mix to the desired shape and finally firing the molded articles.

3. A molding composition for the production of molded products having the approximate chemical formula of $x(MO)yFe_2O_3$ wherein MO represents at least one bivalent metal oxide and where $x$ is approximately equal to $y$, said composition comprising an intimate mixture of between 75 and 25% by weight of a pre-calcined product having the approximate chemical formula specified and between 25 and 75% by weight of at least two raw uncalcined metal oxides which are adapted to form a product of the said approximate chemical formula specified.

References Cited in the file of this patent

UNITED STATES PATENTS

| | | |
|---|---|---|
| 1,728,748 | D'Ans | Sept. 17, 1929 |
| 2,095,982 | Heany | Oct. 19, 1937 |
| 2,340,506 | Biefeld | Feb. 1, 1944 |
| 2,499,789 | Smelt | Mar. 7, 1950 |
| 2,535,025 | Albers-Schoenberg | Dec. 26, 1950 |